April 3, 1934.   J. KUCHAR   1,953,762
LATCHING DEVICE FOR TRAILERS
Filed April 2, 1930   3 Sheets-Sheet 1

Inventor
Joseph Kuchar
By
Williams, Bradbury,
McCabe & Hinkle
Attys.

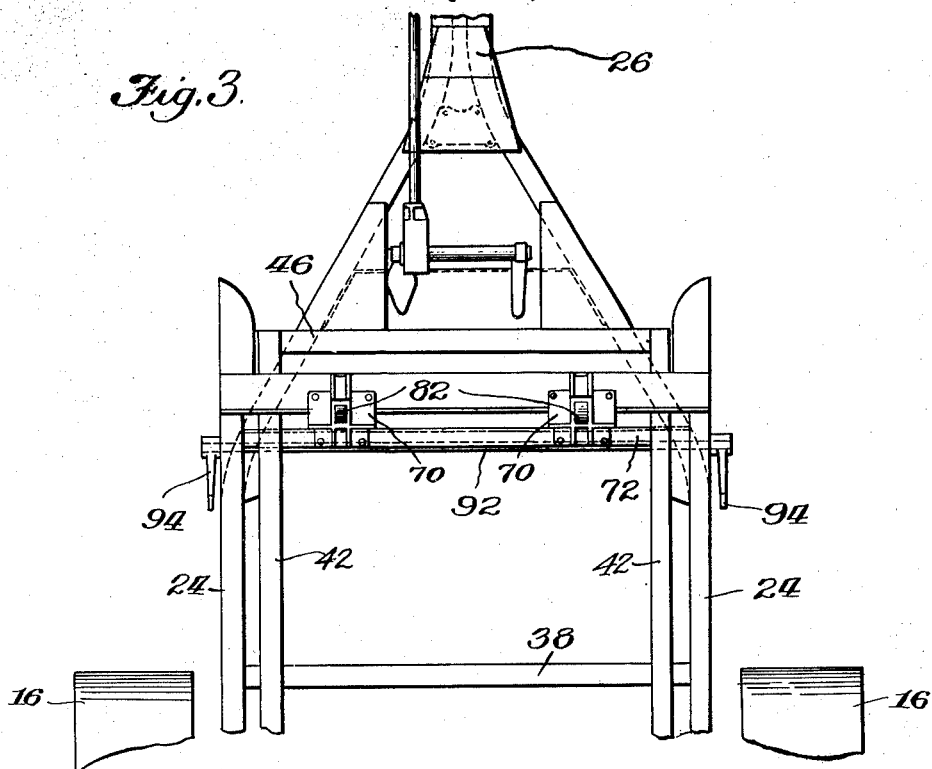
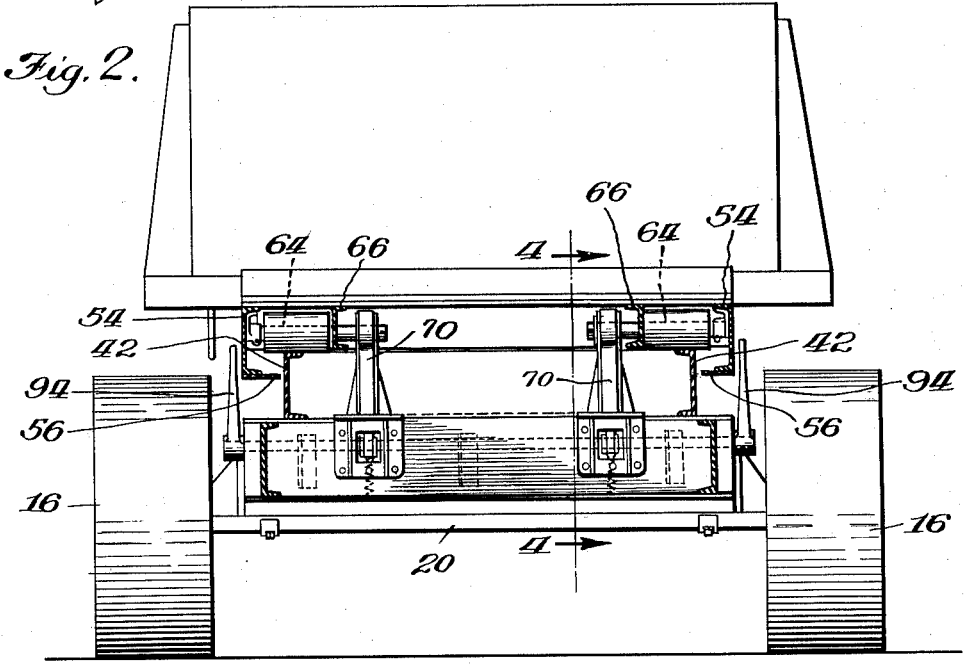

April 3, 1934.   J. KUCHAR   1,953,762
LATCHING DEVICE FOR TRAILERS
Filed April 2, 1930   3 Sheets-Sheet 3
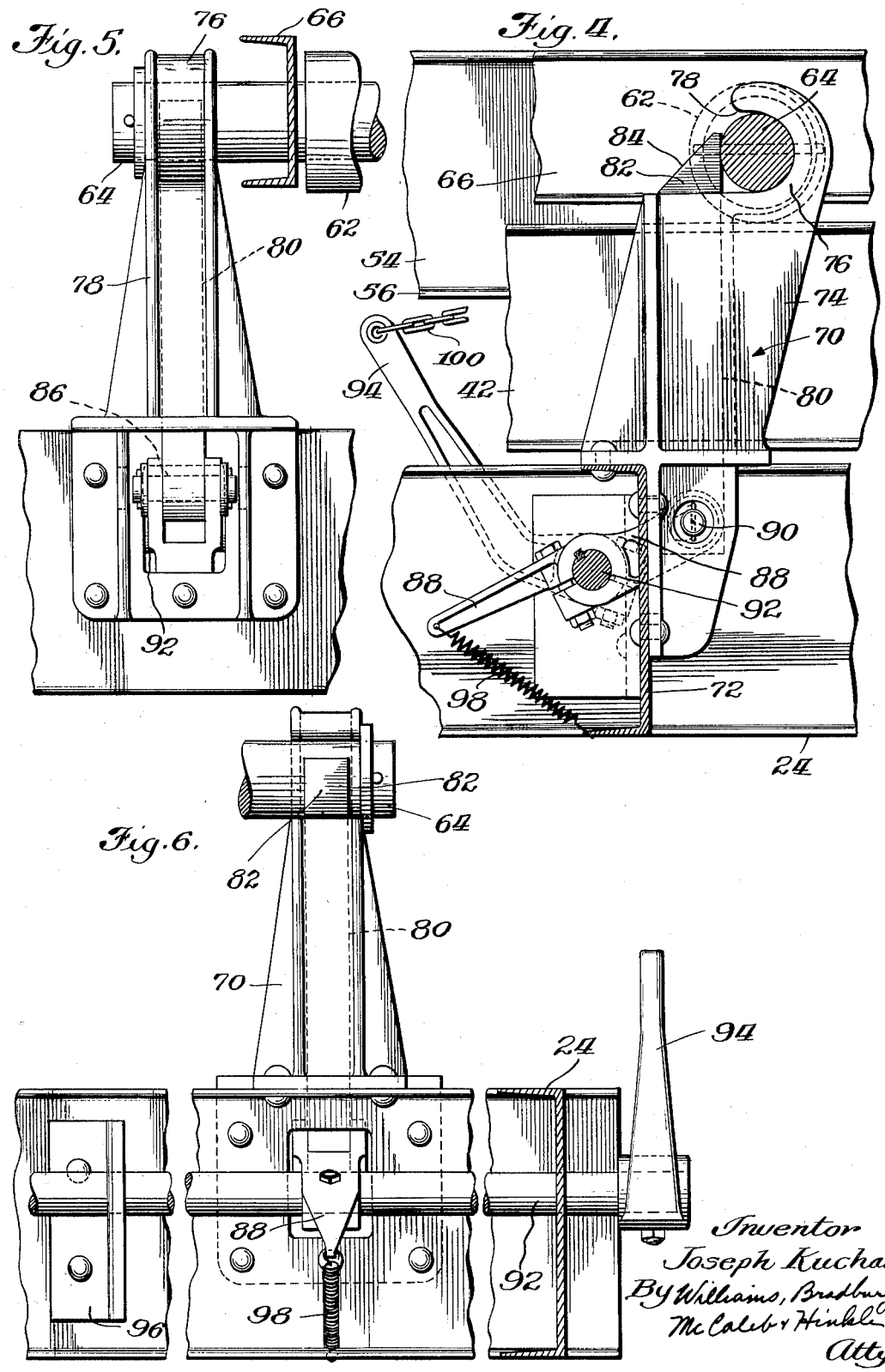

Patented Apr. 3, 1934

1,953,762

UNITED STATES PATENT OFFICE 1,953,762

LATCHING DEVICE FOR TRAILERS

Joseph Kuchar, Chicago, Ill., assignor to Athey Truss Wheel Co., Chicago, Ill., a corporation of Illinois Application April 2, 1930, Serial No. 440,888

2 Claims. (Cl. 298—38)

My invention relates to vehicles provided with removable bodies and more particularly to mechanism arranged to interlockingly engage the vehicle body to prevent accidental displacement of the body from the chassis.

In recent years it has become the practice to construct trucks and trailers with removable bodies. This has been found to greatly facilitate transportation since the bodies of trucks and trailers loaded with cargoes may be unloaded at their destination, and empty bodies may be taken to the cargo source and loaded while the previously transported cargoes are being unloaded.

In accordance with this practice it has become necessary to make certain material changes in the body construction of trucks and trailers. The truck or trailer chassis is usually provided with tracks or skidways and the body with wheels or skids upon which the body may be moved on or off the truck. With this arrangement it is necessary to provide means for retaining the body in place, locking the chassis and body together so that there will be no relative movement between them due to sudden stopping or starting, uneven roads to traverse or other similar conditions.

In the particular embodiment of my invention chosen for illustration herein, I have shown a trailer chassis of the type commonly employed in the harvesting of sugar cane, grain, etc., where the trailers are drawn out to the field and are loaded while others are being hauled to the cane presses, granaries or other destinations. Trailers of this description are provided with tiltable cradles which aid materially in loading removable bodies on the trailer vehicle and special mechanisms for locking this type of chassis and body together must be provided.

The principal object of my invention is to provide a trailer chassis having a tiltable cradle and an automatic interlocking mechanism therefor.

A further object of my invention is to provide an improved self-locking mechanism of the type described that may be unlocked from either side of the vehicle or from a remote position, such as the driver's seat of a tractor or truck that is drawing the trailer.

A further object of my invention is to provide an improved locking mechanism of the type described which prevents lateral or perpendicular relative movement of the body when locked to the chassis.

Another object of my invention is to provide an improved self-locking mechanism of the type described that is sturdily constructed, yet simple to manufacture and assemble.

Other objects and advantages of my invention will appear as this description progresses, reference being had to the accompanying drawings, in which:

Fig. 2 is a vertical sectional view taken on the line 2—2 of Fig. 1 looking in the direction of the arrows;

Fig. 3 is a fragmentary view with the body removed showing the interlocking parts from above;

Fig. 4 is an enlarged vertical sectional view taken on the line 4—4 of Fig. 3;

Fig. 5 is an enlarged view of some of the parts shown in Fig. 4 looking from the rear; and Fig. 6 is an enlarged view of the parts shown in Fig. 4 looking from the front.

Figure 1:
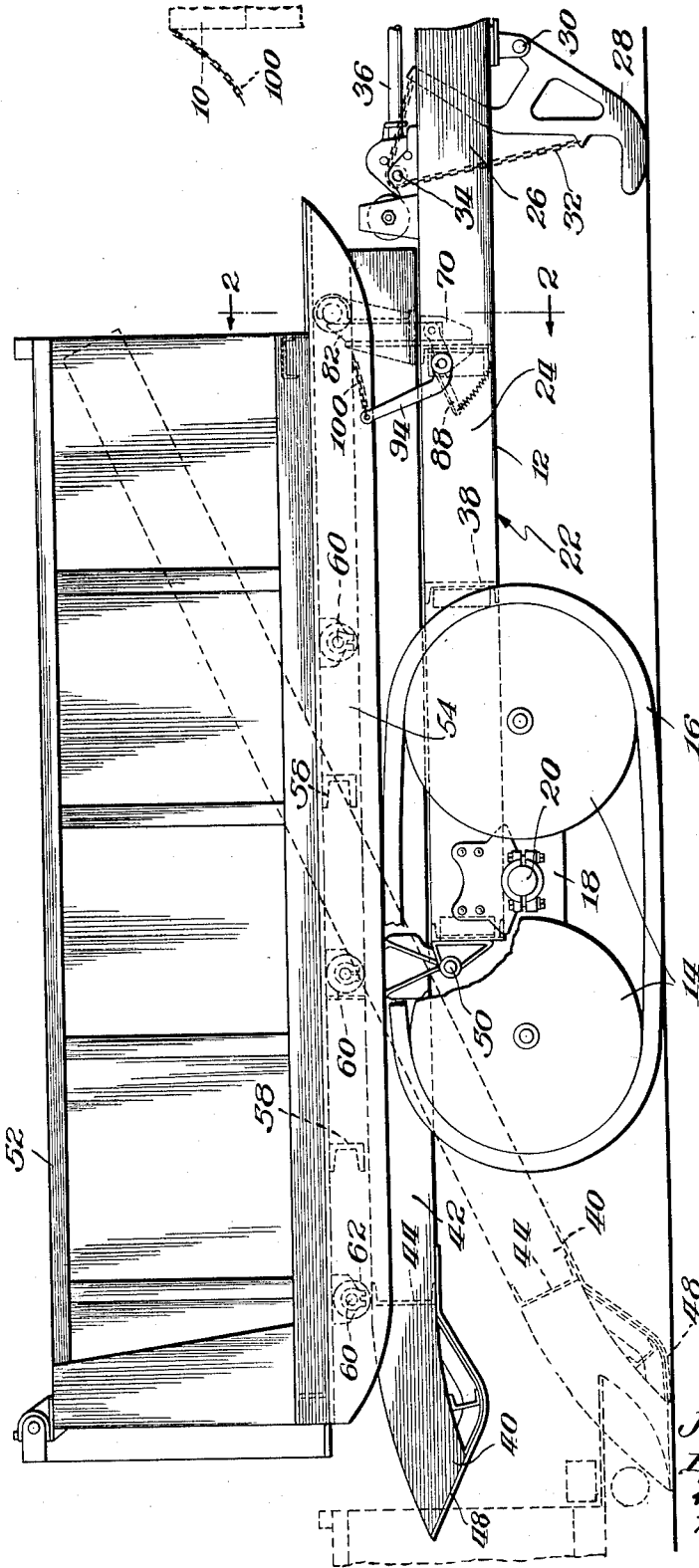
Fig. 1 is a side elevational view of a portion of a tractor and a trailer having a tiltable cradle and a removable body, the body in position on the cradle and securely locked against movement by the locking device of this invention.

Referring to the drawings, a portion of a tractor 10 is shown to which a vehicle in the form of a trailer 12 is attached. The trailer has a running gear of the self-laying track type in which a pair of wheels 14 roll on an endless chain 16. A vehicle of this type is disclosed in the patent to I. H. Athey, No. 1,435,788, issued on November 14, 1922. Wheels 14 are rotatably supported upon a beam 18 which is carried by an axle 20. Axle 20 supports a frame 22 comprising a pair of longitudinal sills 24. Sills 24 converge at their forward end and meet at the apex of a triangle from which they continue parallel for a short distance forming a tongue 26 which carries a coupling (not shown) by which the trailer is attached to the tractor. A foot 28 is pivotally attached to the frame at 30. Chains 32 are attached to the foot and pass around a shaft 34 in such a manner that when the shaft is rotated one of the chains will be wound upon the shaft while the other is unwound.

The lever 36 serves to rotate shaft 34 to position the foot under the frame of the trailer so as to support it in a horizontal position when the trailer is not attached to the tractor and moves the foot free from the ground when the trailer is attached to and supported by the tractor. Sills 24 of the frame are supported and held in spaced relation by a plurality of channel shaped braces 38. Braces 38 form a support for a tiltable cradle or carriage 40 when the cradle is in its normal horizontal position.

The cradle 40 comprises a pair of longitudinally extending beams 42 which are connected together by a plurality of channel shaped ties 44 and at their forward end they are provided with a cross-tie 46. At the rearward end the beams bend downwardly as shown in Fig. 1. The ends of the beams are cut obliquely and carry shoes 48 forming surfaces which lie flat upon the ground when the cradle is in its tilted position.

The beams 42 are pivotally mounted, near their mid-points, upon a pair of brackets 50 which are carried on the end of the frame 22. By this construction the center of gravity of the cradle or carriage will be forward of the pivot point when the cradle is in its normal horizontal position and when the cradle is tilted the center of gravity will shift rearwardly about axle 20 to the left of the axle so that the cradle will be held in either its horizontal or in its tilted position by gravity.

A removable body 52 is adapted to be supported upon the cradle or carriage of the trailer. The removable body is provided with a pair of longitudinally extending supports 54, preferably channel shaped, which taper upwardly at their ends and have runners 56 attached to their lower side which serve as skids when the body is dragged along the ground. The runners 56 are made wide enough to prevent the body cutting into the ground when the ground is soft or miry.

Supports 54 are held in spaced relation by a plurality of channel shaped braces 58. A plurality of cross shafts 60 are located between the supports and a pair of rollers 62 is mounted upon each cross shaft 60.

At the forward end of the removable body a pair of short stub shafts 64 is provided supported near their inner ends by longitudinal channel members 66. The shafts 64 carry rollers 65 and the rollers 62 and 65 are held in a definite spaced position upon their respective shafts by any suitable means so as to coincide with the spacing of the beams 42 of the tiltable cradle so that when the removable body is drawn upon the cradle, rollers 62 and 65 will roll upon the beams. It should be noted that the shafts carrying the rollers are mounted upon the supports in such a position that the lower surface of the rollers is above the lower edge of the runners. In this manner the body will rest upon its runners when positioned on the ground and the rollers will come into operation only when the body rests upon the cradle.

Body 52 will be of any desired construction and, as the particular construction of the body is not the subject matter of this invention, no further description is thought necessary.

The means for locking the body to the trailer which form the subject matter of this invention will now be more thoroughly described. A pair of latch housings 70 are shown attached by means of rivets or other fastening means to a cross beam 72 of the frame 22. Each latch housing 70 is formed with an upwardly extending portion 74 having at its uppermost end a hook portion 76, the opening 78 thereof facing the rear of the trailer. Adjacent the opening 78 a vertical passageway 80 in portion 74 is adapted to journal and guide a dog or latch member 82. Latch member 82 is provided at its upper end with a cam face 84 and at its lower end with an opening 86.

A latch operating lever 88 is connected to latch member 82 by a pin 90 which passes through opening 86 and suitable openings in lever 88. Lever 88 is securely mounted on a cross shaft 92 which extends through the sides of sills 24 and carries at either end an operating handle 94. Intermediate the sills 24 shaft 92 is supported in clip-angle brackets 96. Spring 98 attached to lever 88 normally tends to hold lever 88, and latch member 82 is in position shown in the drawings (Fig. 4).

In operation, let us assume that a loaded removable body is being drawn upon the trailer. As the body moves forward with rollers 65 and 62 rolling on beams 42 of the cradle, rollers 65 at the front of the body will approach latch members 82 yieldingly held in the position shown by springs 98. Continued forward movement of the body causes each shaft 64 to contact with cam surface 84 of the latch, depressing the same and allowing shaft 64 to enter the hook 76, which arrests further forward movement.

After shaft 64 has passed over latch 82, the latch resumes its normal position due to the urging of spring 98 and shaft 64 is positively locked in place. No further movement in any direction is possible, the shaft being securely locked in position.

To unlock or release the body, all that is necessary is to grasp the handle of lever 94 and pull forward, and in order to enable a person seated on the tractor to unlock the body, a chain 100 may be provided extending to the tractor. Forward pull on chain 100 will also unlock the mechanism.

The invention has been described with reference to a trailer, but it will be understood that the invention would work equally as well if the body carrying vehicle were made a permanent part of the tractor as, for example, in a truck construction, and the term "vehicle" as used in this specification may be intended to include a truck as well as a tractor or a trailer.

While I have illustrated a preferred embodiment of my invention, many modifications may be made without departing from the spirit of my invention, and I do not wish to be limited to the precise details of construction set forth, but desire to avail myself of all changes within the scope of the appended claims.

Having thus described my invention, what I claim is new and desire to secure by Letters Patent of the United States is:

1. A vehicle comprising a frame, wheels for supporting said frame, a carriage tiltably mounted on the frame, a removable body mounted on the carriage, an automatic locking means for locking said body to said frame comprising a bracket mounted on said frame, a rearwardly facing hook portion formed thereon, and a locking bolt slidably mounted in said bracket, said locking bolt and said hook portion cooperating to automatically lock said body upon said frame, and manually operable means for unlocking said body from said frame.

2. In combination a vehicle comprising a frame having wheels for supporting said frame, a cradle tiltably mounted thereon, a removable body having a cross shaft and rollers thereon adapted to be drawn upon the tiltable cradle for transportation, a bracket mounted on said frame having a hook portion adapted to engage said cross shaft, a locking bolt mounted in said bracket normally overlying said hook portion, and a cam surface on said bolt for engagement with said cross shaft and manual means for operating said locking bolt.

JOSEPH KUCHAR.